US009509843B1

(12) United States Patent
Baross

(10) Patent No.: US 9,509,843 B1
(45) Date of Patent: Nov. 29, 2016

(54) METHOD AND SYSTEM FOR USE IN ALERTING OWNERS TO PROPERTY OCCURRENCES

(71) Applicant: Beth Baross, Ridgewood, NJ (US)

(72) Inventor: Beth Baross, Ridgewood, NJ (US)

( * ) Notice: Subject to any disclaimer, the term of this patent is extended or adjusted under 35 U.S.C. 154(b) by 0 days.

(21) Appl. No.: 14/571,228

(22) Filed: Dec. 15, 2014

Related U.S. Application Data

(60) Provisional application No. 61/915,827, filed on Dec. 13, 2013.

(51) Int. Cl.
| H04M 11/04 | (2006.01) |
| H04M 3/51 | (2006.01) |
| H04M 3/00 | (2006.01) |
| H04L 12/66 | (2006.01) |

(52) U.S. Cl.
CPC ................................. *H04M 3/5158* (2013.01)

(58) Field of Classification Search
CPC .. G06Q 30/0257; G06Q 99/00; G06Q 50/01; G06Q 50/16; G06Q 10/20; G08B 25/009; G08B 25/016; G08B 27/00
USPC ........................ 379/37, 45.265, 266; 340/501
See application file for complete search history.

(56) References Cited

U.S. PATENT DOCUMENTS

| 5,686,886 | A | 11/1997 | Stensney | |
|---|---|---|---|---|
| 6,778,084 | B2 | 8/2004 | Chang et al. | |
| 7,808,378 | B2 | 10/2010 | Hayden | |
| 8,364,115 | B2 | 1/2013 | Blair et al. | |
| 2002/0080025 | A1* | 6/2002 | Beattie | 340/506 |
| 2002/0181667 | A1* | 12/2002 | Campbell | 379/45 |
| 2003/0012344 | A1* | 1/2003 | Agarwal | H04M 11/04 379/37 |
| 2003/0022684 | A1 | 1/2003 | Seeger | |
| 2003/0229474 | A1* | 12/2003 | Suzuki et al. | 702/188 |
| 2006/0064305 | A1* | 3/2006 | Alonso | 705/1 |
| 2006/0112103 | A1* | 5/2006 | Besserman et al. | 707/10 |
| 2006/0131869 | A1 | 6/2006 | Brignull | |
| 2006/0140200 | A1* | 6/2006 | Black et al. | 370/401 |
| 2007/0116189 | A1* | 5/2007 | Clawson | 379/37 |
| 2007/0210910 | A1* | 9/2007 | Norstrom | G08B 27/001 340/506 |
| 2007/0216535 | A1* | 9/2007 | Carrino | G06F 17/3087 340/573.1 |

(Continued)

OTHER PUBLICATIONS

M. Matsumoto, et al, School Health vol. 2, 17-26, 2006 "Behavioral Models of Continuing the Neighborhood Watch Schemes—The Relationship between the Attitudes Towards Crime Prevention and Sense of Community".

*Primary Examiner* — Fan Tsang
*Assistant Examiner* — Kharye Pope
(74) *Attorney, Agent, or Firm* — W. Patrick Quast

(57) ABSTRACT

The notification subscription service methodology and system provides notice to at least two contact persons when an event occurs that may affect property, or that might involve an individual such as an elderly parent in whom these persons have an interest. Pertinent information about the property or person as well as the contact persons is solicited at the time of subscription. The information is stored in a computer database in a call center. Materials are provided to the subscriber including a yard sign or window decal that has a distinct visual appearance and call center contact information. Nearby neighbors are provided with a card which includes the property address and owner's name and instructions to call the center when an event occurs. This contact by an observer of the event triggers a preferred question protocol and leads to the contacting of the contact persons through preferred contact modes such as cell phone, text, regular phone or e-mail.

11 Claims, 16 Drawing Sheets

(56) References Cited

U.S. PATENT DOCUMENTS

| | | | | |
|---|---|---|---|---|
| 2008/0284587 A1* | 11/2008 | Saigh | H04M 1/72541 | 340/539.13 |
| 2009/0102644 A1* | 4/2009 | Hayden | G08B 27/003 | 340/540 |
| 2009/0319361 A1* | 12/2009 | Conrady | | 705/14.26 |
| 2010/0073161 A1* | 3/2010 | Engel | G08B 27/005 | 340/540 |
| 2011/0117878 A1* | 5/2011 | Barash | G08B 21/0211 | 455/404.2 |
| 2011/0258200 A1* | 10/2011 | Drummond | | 707/748 |
| 2012/0092161 A1* | 4/2012 | West | G08B 25/005 | 340/540 |
| 2012/0150966 A1* | 6/2012 | Fan | G06Q 10/107 | 709/206 |
| 2013/0009749 A1* | 1/2013 | Vijayaraghavan | G08B 27/003 | 340/10.1 |
| 2013/0082835 A1* | 4/2013 | Shapiro | G08B 3/10 | 340/539.1 |
| 2013/0231077 A1* | 9/2013 | Cahill | | 455/404.2 |
| 2014/0035741 A1* | 2/2014 | Morehead | | 340/501 |
| 2014/0072111 A1* | 3/2014 | Klaban | B60R 25/33 | 379/45 |
| 2014/0120860 A1* | 5/2014 | Amis | G08B 25/005 | 455/404.1 |
| 2015/0022342 A1* | 1/2015 | Will et al. | | 340/521 |

* cited by examiner

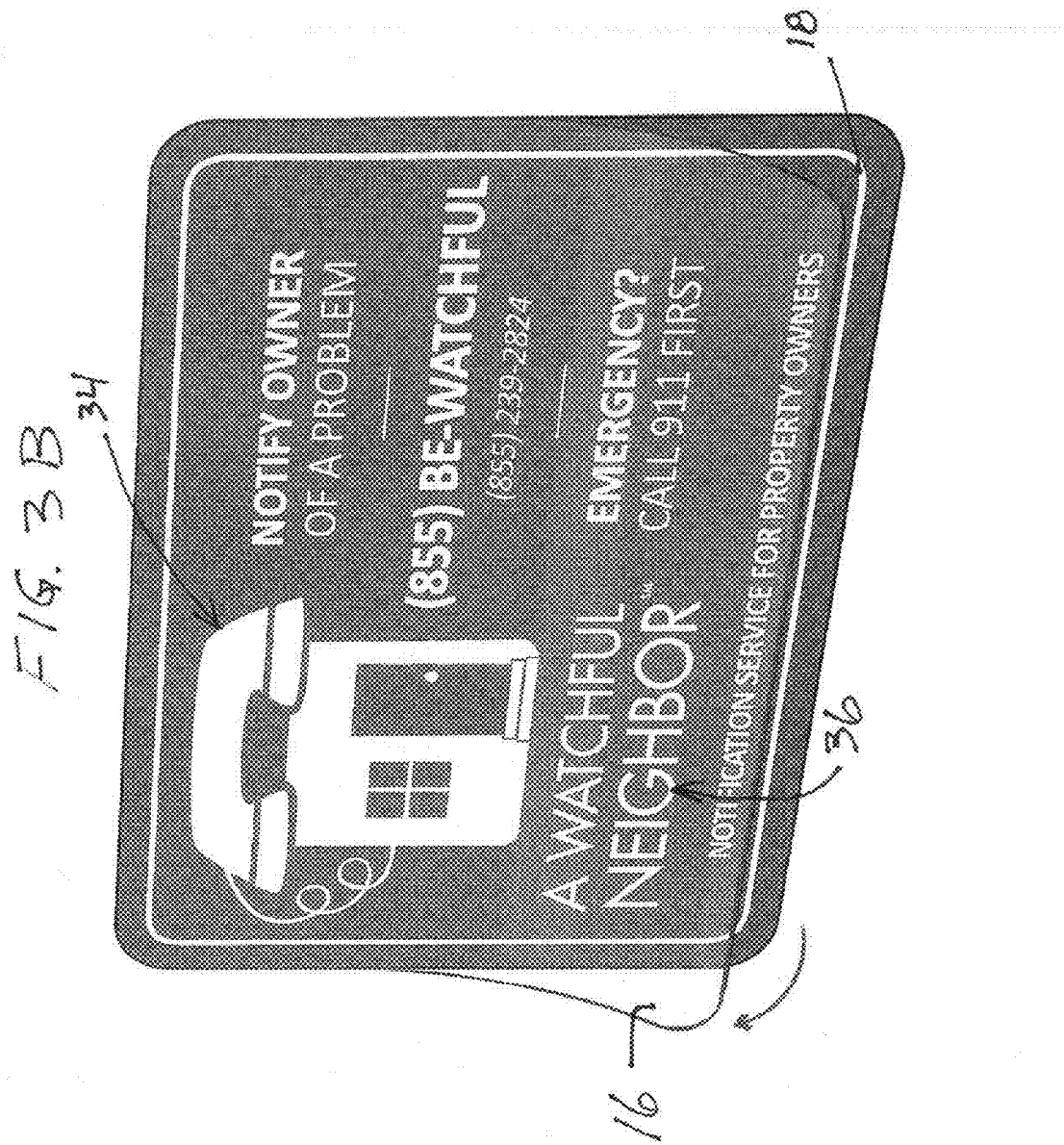

| | Neighbor." |
|---|---|
| | NO: "May I have your contact information, but please know that it will not be shared with the property owner without your consent." |
| IF CALLER AGREES TO PROVIDE CONTACT INFORMATION:<br><br>"May I have your first and last name, please?"<br><br>"May I have the best phone number to reach you please?"<br><br>"May I have your email address please?"<br><br>"May I ask, do you consent to your contact information being provided to the property owner should they wish to contact you?"<br><br>[yes or no, proceed below] | IF CALLER DOES NOT AGREE TO PROVIDE CONTACT INFORMATION: proceed below |
| "I will notify the property owner immediately. Thank you for taking the time to call A Watchful Neighbor." | |

| HOME | | | |
|---|---|---|---|
| "Do you know the address of the property please?" | YES: "May I have the address of the property please *(full or partial address)*?"<br><br>NO: "I will need the address in order to notify the owner of the issue. Are you able to obtain the address while we are on the phone? [Yes, proceed right. No, proceed below] | IF ADDRESS IS LOCATED IN THE DATABASE: "To help confirm that we have the right property, what type of property is this regarding?" *(House, townhouse, apartment [within a house], apartment/ condominium [within a multi-unit bldg.], multi-unit building, business)*<br><br>PICK UP SCRIPT<br>Go to Fig.5A | IF ADDRESS IS NOT LOCATED IN THE DATABASE: [Agent tries to obtain a partial address or owner's first or last name & performs search]<br><br>If search is not successful in locating in database, proceed below. |
| | "Unfortunately, without the address, I am unable to locate the owner of the property. Please call back if you are able to determine this information. Thank you for taking the time to all A Watchful Neighbor." | | |
| CAR | | | |
| "Do you know the vehicle's license plate number and the state that issued it please?" | YES: "May I have the license plate number and issuing state of the vehicle please?"<br><br>NO: "I will need the license plate number and issuing state of the vehicle in order to notify the owner of the issue. Are you able to obtain the license plate number and issuing state of the vehicle while we are on the phone? [Yes, proceed right. No, proceed below] | IF LICENSE PLATE & ISSUING STATE IS LOCATED IN THE DATABASE:<br><br>PICK UP SCRIPT<br>Go to Fig.5A | IF LICENSE PLATE & ISSUING STATE IS NOT LOCATED IN THE DATABASE: proceed below. |

| | | | |
|---|---|---|---|
| | "Unfortunately, without the license plate number and issuing state of the vehicle, I am unable to locate the owner of the car. Please call back if you are able to determine this information. Thank you for taking the time to call A Watchful Neighbor." | | |
| BOAT | | | |
| "Do you know the registration number of the boat please?" | YES: May I have the registration number of the boat please?"<br><br>NO: "I will need the registration number of the boat in order to notify the owner of the issue. Are you able to obtain the registration number of the boat while we are on the phone? [Yes, proceed right. No, proceed below] | IF BOAT REGISTRATION NUMBER IS LOCATED IN THE DATABASE:<br><br>PICK UP SCRIPT Go to Fig.5A | IF BOAT REGISTRATION NUMBER IS NOT LOCATED IN THE DATABASE: proceed below. |
| | "Unfortunately, without the registration number of the boat, I am unable to locate the owner of the boat. Please call back if you are able to determine this information. Thank you for taking the time to call A Watchful Neighbor." | | |
| BUSINESS | SAME AS "HOME" | | |

*FIG. 5D*

METHOD AND SYSTEM FOR USE IN ALERTING OWNERS TO PROPERTY OCCURRENCES

RELATED APPLICATIONS

This application claims the benefit of U.S. Provisional Application No. 61/915,827, filed Dec. 13, 2013, which is incorporated herein by reference, in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to a notification service that advises absent property owners of occurrences affecting their property and more particularly, to a method and system wherein one or more of a cadre of watchful neighbors, many solicited but others that are not, including passersby, postal carriers, emergency personnel, utility workers, etc., without knowledge of an absent property owner's personal contact information, report such occurrences to a central office for subsequent communication to at least two contact persons. The subscriber and the property owner are typically contact persons but they need not be. As noted, the individual who contracts with the notification service of the present invention is referred to as the "subscriber". Again, in most circumstances he is also the property owner, tenant or the person with the greatest interest in being warned of circumstances that could adversely affect his/her property. However, the subscriber may contract with the notification service so as to be advised of such circumstances when they affect another for whom the subscriber assumes some type of responsibility, such as a family member, for example an elderly parent or child. Also, the notification service of the present invention not only seeks coverage for property, it provides a way for interested observers to report to a contact person about circumstances wherein a family member may be experiencing health or safety challenges.

As just noted, the subscriber need not be the owner of the property. The expression "subscriber/owner" will be used hereinafter as shorthand for the phrase "subscriber or owner" as a convenience to note the possible need for the alternate characterization in a particular situation that should be apparent from the context.

BACKGROUND OF THE INVENTION

When a property owner is away from his home, business or other location where he spends a predictable amount of time either short term or long, his property, both real and personal are subject to occurrences and events that, if left unaddressed, can result in damage thereto and/or the surroundings.

Conditions can arise which may threaten the owner's property or result in a condition or circumstance which can prejudice the owner's safety upon his return.

Of course, numerous alarm and warning systems exist. These typically will alert a property owner to an associated condition generally occurring within the premises, such as fire, carbon monoxide leakage and the like. Their effectiveness, in terms of immediate response, many times, is premised on the property owner being on location at the time of the occurrence. Other systems are wired in a manner that a communication link to emergency providers is enabled so that they can respond in as timely a fashion as the circumstances allow. These systems generally include a central monitoring capability. The system is set up such that an attempt at some form of "immediate" communication concerning the occurrence can be made to the property owner. Of course, some events, e.g. a burst water pipe, can occur beyond the effective range or capability of the non-visual alarm sensors, albeit on the property so that they go undetected with possible catastrophic results.

Neighbors (including passersby, postal carriers, emergency personnel, utility workers, etc., hereinafter referred to collectively as "neighbor(s)"), may observe these occurrences and will think to contact the property owner. However a neighbor may not be able to do this, particularly if there is no information available to that person which would allow him to contact the individual. Of course, this is especially the case if the observer is a passersby, postal carrier, emergency personnel, utility worker, etc. Further, an event can occur when the property owner is away for only a brief time, for example, on an overnight trip or even when out shopping. Property owners in such cases seldom bother to alert their nearby neighbors to their brief absence from their home or other location.

In some of these situations, where appropriate, the neighbor can call the police or other emergency providers and hopefully these will respond and arrive in time to minimize the consequences of the event. However, absent a prescribed procedure for bringing the matter to the attention of the owner, the latter may not find out about the occurrence until he returns to the location as he originally scheduled. The owner's ability to take affirmative action before he returned is thus precluded.

Further, the neighbor in many circumstances is without knowledge about any alarm system on the premises: i.e., how it is actuated; where the sensors are; and how it might be disabled. In this event, the alarm indicating mechanism or components would continue with their associated audible indications and would continue until the batteries were removed or the power to the circuit, or in the worse case to the location, was disconnected. Of course, this would negate the detection capability of the system going forward, thus potentially jeopardizing the safety of the premises until the owner returns.

Even with these alarm systems in place, as noted above, not all unanticipated activity on a property or its immediate environs will necessarily give rise to an activation of the alarm mechanism. For example, burglars or unwanted persons may enter onto the property or the home. Without motion detectors present, their intrusion will go undetected. Of course, if the detection equipment is not enabled or fails to operate, no automatic detection will occur.

Further occurrences can involve property of the owner on the exterior of the owner's home or at an off-site location within the control of the owner. The property could be located at an owner's business, vacation home, apartment or other location. It could involve the owner's personal property for example, a car, a boat or other water craft or airplane located at a respective marina or airport. Further, the property or well-being of a family member for example, an elderly or disabled parent, a student away at school, a family member at the family vacation home on separate vacation, and so forth, can be protected through utilization of the present invention.

Other occurrences can also require the immediate attention of the owner: a garage or front door accidentally left open; sprinklers left on; milk and newspaper deliveries that were not stopped; packages, goods or dry cleaning delivered and left out for a long time; a potentially unauthorized party (teen, etc.) on the premises and your neighbor does not want to call the police . . . yet; strange car or truck in driveway for extended period of time.

Still other conditions can occur that are not disposed to detection by automatic detectors and alarm systems. These include: children locked out or in need of assistance; elderly family members exhibiting troubling but not life threatening behavior; wandering pet; a family member treated by emergency responders while home alone; power outage in the neighborhood; severe weather conditions; flooding or other water concerns.

Further, in today's environment, people are leery of providing personal identification and contact information to all but a select few. Thus people are protective of their cell phone number, e-mail address and varied social media contact information. This justifiable concern limits the pool of individuals (such as those mentioned above) who under the variety of circumstances noted could initiate the clarion cry that would bring a particular matter to the attention of the owner.

Various notification and warning methods and systems have sought protection for property owners through the US Patent system. Some of the proposed techniques identified are summarized in the following paragraphs.

USPAN 2013\0009749—This application is directed to a neighborhood watch system which includes a plurality of electronic surveillance systems appropriately Geo-Tagged. A network control center is identified to which members of a plurality can communicate an alarm or incident indicating message along with their respective Geo-Tag. This is a relatively complex electronic system.

USPAN 2012/0092161—Reveals a community notification system (CNS) wherein a system user (who lives in a residential neighborhood) might notice suspicious activity while driving past a neighbor's house, sends an event alert (relating to the suspicious activity) to the CNS, and other system users are in turn notified by the CNS. Again, this appears to be a somewhat more complicated system which may not be cost-effectively installed, since in part, it involves contacting all residents in the neighborhood.

USPAN 2006/0131869—Discloses use of a sticker attachable to a building and includes emergency warning indicia to aid alerting others of animals in the need of care and also confirm the location of the animals.

USPAN 2003/0022684—The Abstract discusses a system, method and device for enabling an individual positioned in a first location to be advised of a noteworthy situation in a second location of interest thereby enabling an individual to take appropriate action to prevent potential loss of property and/or life. Again, a somewhat sophisticated warning system is disclosed.

U.S. Pat. No. 8,364,115—The Abstract discusses an anonymous hazardous condition alert system and process which enables individuals to alert property owners of potentially hazardous conditions associated with their property. An alerting user, upon viewing a hazardous condition, locates a telephone number on a sign disposed proximate to the property in question and calls the telephone number to be connected to a hazardous condition alert system.

U.S. Pat. No. 7,808,378—An alert notification system and method for neighborhoods is discussed.

U.S. Pat. No. 6,778,084—A surveillance and security system adapted to be applicable to a single premise is discussed.

U.S. Pat. No. 5,686,886—A neighborhood watch circuit is discussed wherein the occurrence of an emergency event can be identified by a member of the neighborhood watch circuit and through an electronic alert unit, transmit to an appropriate emergency service provider the occurrence of the event and its location as well as advise the property owner affected by the emergency event.

OBJECTS OF THE PRESENT INVENTION

Therefore, it is important that a method and system exist which can bring both the occurrence of these circumstances to the attention of the subscriber/owner or his/her designated contact persons, as quickly as possible; and allow for the contacting of emergency personnel contemporaneously, or initially, when the circumstances, actual or possible, warrant it.

It is a further object of this invention to accommodate the need for judgment in prioritizing the sequence of contact communications, the party(ies) to contact; the mode of contact communication; and other discretionary actions to be taken.

It is a further object of the invention to allow communication to the subscriber/owner or his/her designated contact persons without the notifying individual or subscriber having any personal contact information about the other.

It is still another object of the invention to provide a method and system whose timeliness and effectiveness is not diminished by the lack of electrical power at the property location.

It is yet a further object of the invention to provide a method and system that expands the pool of effective, involved observers who can quickly bring the matter to the attention of the service and thus the subscriber/owner or his/her designated contact persons.

It is still another object of the invention to enable the subscriber to designate the communication mode for getting in touch with him and/or the other designated contact persons about an observed event.

Still, another object of the invention is to allow occurrences involving a person (the elderly, children, etc.) associated with the subscriber to be brought to the attention of the subscriber or his designated contact persons.

SUMMARY OF THE INVENTION

The invention comprises a notification service embodied in a method and system provided by an operator and implemented by a central call center office to alert a subscriber of the service, and/or his designated contact persons, about events that do or may have consequence to real or personal property belonging either to the subscriber or to an individual having an association with the subscriber and for whom the subscriber accepts some type of responsibility.

If enlisted by a potential subscriber, the service operator first collects pertinent information including: (1) subscriber personal information including name (personal or business), address, contact information such as preferred telephone number and/or e-mail address; (2) information about the property(ies) to be covered (registered property(ies)), e.g., the address of the property (house, business, apartment, and the like), as well as unique features such as type, e.g., house-detached—stands alone/house-townhouse/apartment-within a house/apartment-condo-multi unit building/entire building of multi-unit dwellings. In due course this information is entered in the call center's database for future reference. If the subscriber elects to cover other property items, for example, a car or boat, pertinent information such as a license plate number and state, and/or boat registration number, etc., is furnished by the subscriber to the service and entered in the database as well. (3) In addition, the subscriber is queried by the operator about contact information. The subscriber is directed to provide the name of each contact person (at least two) to be contacted upon the occurrence of an event. If the subscriber is to be contacted he/she must identify themselves as one of such people. Information about the modes of contact, i.e. phone (cell), text (cell) e-mail, phone (home), phone (work), are collected and where there is more than one contact mode for a respective contact person, the preferred sequence of employing the contact modes to reach the respective contact person is provided.

Once the subscriber is enrolled and the information collected, the service will provide various informational materials. These will be forwarded to a recipient (presumably the subscriber or owner) as directed by the subscriber. These include a communication from the notification service operator to the recipient setting forth at least, a step by step procedure to be followed in implementing at least a portion of the notification service procedure. The informational materials will further include notification signs. These notification signs include information (telephone number and/or web site address) about how to contact the central call center. These notification signs are to be strategically placed on or about the property of the subscriber/owner as suggested by the initial communication or other communications provided by the operator or its agent. These notification signs have a distinct visual appearance based on one or more of characteristics including color, shape, and trademark. This allows for easy recognition by observers.

The method and system further provides for at least one "neighbor notification card". As directed by the initial communication, the recipient places the property owner's name in the appropriate space provided. Additional room is provided on the "neighbor card" to describe the property, for example, as to a home, the street address and other identifying features such as type of home. Further, the notification card includes preprinted information noting that the subscriber/owner has signed up with a notification service and what the recipient of the card is to do if "something happens to my property". Also, they are instructed what to do for emergency situations, namely "call 911 first" and then the service. As directed by the initial communication, these cards are to be distributed to all neighbors in the vicinity of the venue or property of interest. The subscriber/owner is encouraged in the initial communication to distribute as many cards that he or she can. This maximizes the probability that the subscriber/owner will be notified.

The invention requires the provisioning of a central call center. As noted above, pertinent information received from the subscriber at sign-up and related to the property(ies) to be registered and contact persons is suitably formatted and stored in a computer database which is accessible to the call center. Again, the initial solicitation obtains the preferred modes of contact, and the preferred sequence, by which the subscriber, and/or his additional contacts are to be advised, including telephone (cell, home or work), e-mail and text.

The method and system includes a programmed computer having a database wherein the solicited predetermined pertinent information for each subscriber is stored and wherein the programmed computer allows subsequent access in implementing the process so that the pertinent customer information is readily accessible to an employee of the central call center as needed to implement the notification service.

The central call center is adapted to receive a notification call from an observer about an event involving the property associated with a respective subscriber or a person associated with the subscriber. The central call center is further adapted through the use of an appropriate question protocol and through access to the computer database to deduce the subscriber's name and contact person(s) information.

In a preferred implementation of the present invention, attempts are made by the call center to "simultaneously" reach all designated contact persons. If none of the attempts are successful, the call center continues in its efforts until minimally, one connection is made whereupon the call center's obligation is considered to be satisfied. In the case of e-mail or texting, there would be no follow up to confirm receipt.

BRIEF DESCRIPTION OF THE DRAWINGS

FIG. 3B is a perspective view of an example of a signage decal that can be placed on the interior surface of a door window or other window having a self-adhesive front surface with a release film;

FIGS. 5A, 5B, 5C and 5D is a schematic block diagram detailing scripted questions and the order presented as part of the implementation of the present invention;

DESCRIPTION OF THE PREFERRED EMBODIMENT

Figure 1:
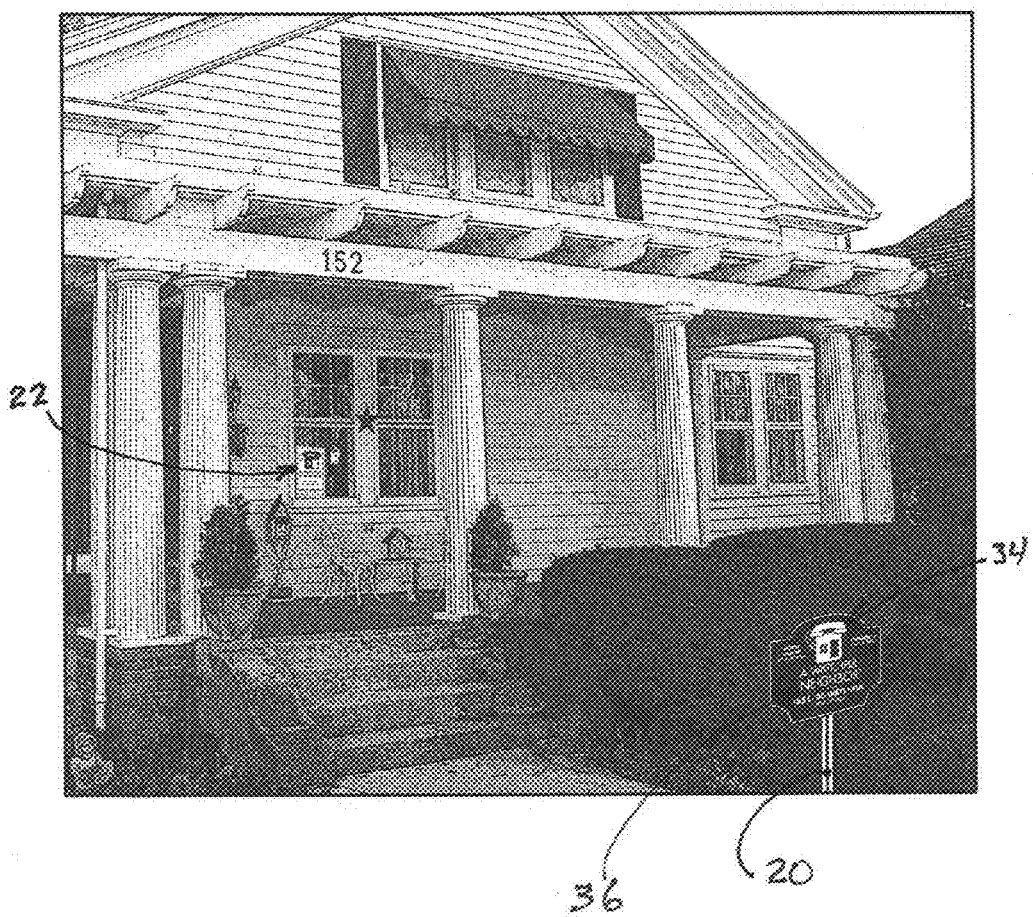
FIG. 1 is a scanned image of a representation of a portion of the current invention including the depiction of a sign on the property front lawn as well as a sign/sticker on a window adjacent the front entrance.

Referring to the drawings, elements of the invention are depicted standing alone and/or in place on various items of property.

As discussed hereinafter, the individual who contracts with the notification service of the present invention is referred to as the "subscriber". In most circumstances he is also the property owner, tenant or the person with the greatest interest in being warned of circumstances that could adversely affect property in question. However, the subscriber may contract with the notification service so as to be advised of such circumstances when they affect another for whom the subscriber assumes a responsibility, such as a family member, for example an elderly parent or child. The subscriber need not be a contact person although in most cases he/she probably will be. The notification service of the present invention not only seeks coverage for property, it also provides a way for interested observers to report to the subscriber and/or his designated contact persons about circumstances wherein a family member may be experiencing health or safety challenges.

An individual interested in the services provided by the invention, will typically become aware of this through advertising, word-of-mouth, or keyword lookup on the Internet. Also, partnering relationships with key emergency agencies within a given venue, such as the fire and police departments, provide exposure of the available service in a community. Likewise, existing subscribers/owners are a source for new enrollees.

Once a potential subscriber decides to enroll in the notification service, and makes contact with the operator of the service by phone or online, the individual is directed to provide pertinent information. This data is necessary to accomplish the purposes of the service.

The information includes personal information such as the subscriber's name, address, phone-contact information and e-mail address (es). This is used principally for billing purposes.

Beyond the personal information provided by the subscriber, the property to be registered by the service must be sufficiently identified as well. This typically is the subscriber's home or business, but could be that of another, for example the subscriber's elderly parent. Of course, it may include a vacation home, apartment rental, a vehicle (s), boat or other form of property, typically of sufficient value to warrant registration and thus coverage under the service. Of course, multiple property items can be registered. The subscriber provides the operator of the service with pertinent property information. For example, the name of the owner and address, type of property, for example detached house, townhouse, condominium or apartment unit, condominium complex or multifamily unit (where the subscriber could be the condominium Association or landlord or managing agent, respectively) would be supplied.

Personal property can be covered by the notification service of the present invention as well. If the subscriber seeks to include a car or truck, the license plate number and State would be provided to the operator. Of course, multiple vehicles can be registered and respective plate numbers and registration States would be provided. Boats can be registered by providing the registration number which typically is placed on the vessel so as to be observed by others.

It is envisioned that supplementary information which would be more apparent to an observer can be provided to the operator at registration. So for example the type of boat, power or sail, name, and like information can be provided to the operator.

A third set of information critical to the operation of the notification service is the relevant contact person information. This is profile information of everyone who is to receive notifications from the service for the registered property. If the subscriber/owner is to receive notification, he/she would be identified as a so-called contact person. The information would include the name of the individual and the alternate modes for immediate contact, for example, cell (for both calls and text), work and home phone numbers and e-mail address. Similar information concerning any additional contact persons is also solicited. The subscriber is required to provide information for at least two contact persons and as many contact modes, up to a predetermined number, and the preferred sequence of contact mode, for each contact person. This will maximize the probability of the contact persons being successfully notified.

Figure 10:
FIG. 10 is a plan view of one form of an initial instruction communication letter from the service operator to a subscriber.

The service of the present invention includes the provisioning of a plurality of informational and functional materials. These materials are provided to a recipient that is designated by the subscriber and typically is the subscriber or property owner. The materials typically include a written instructional sheet, FIG. 10, which lays out the steps the subscriber/owner should follow to optimize the performance of the notification service.

The procedural steps set out on the written instructional sheet encourage the subscriber/owner to make sure that the number address of the home, as physically displayed on the home, yard pole or curb is "clearly visible", that is, "CLEARLY MARKED and very visible to others."

Figure 3A:
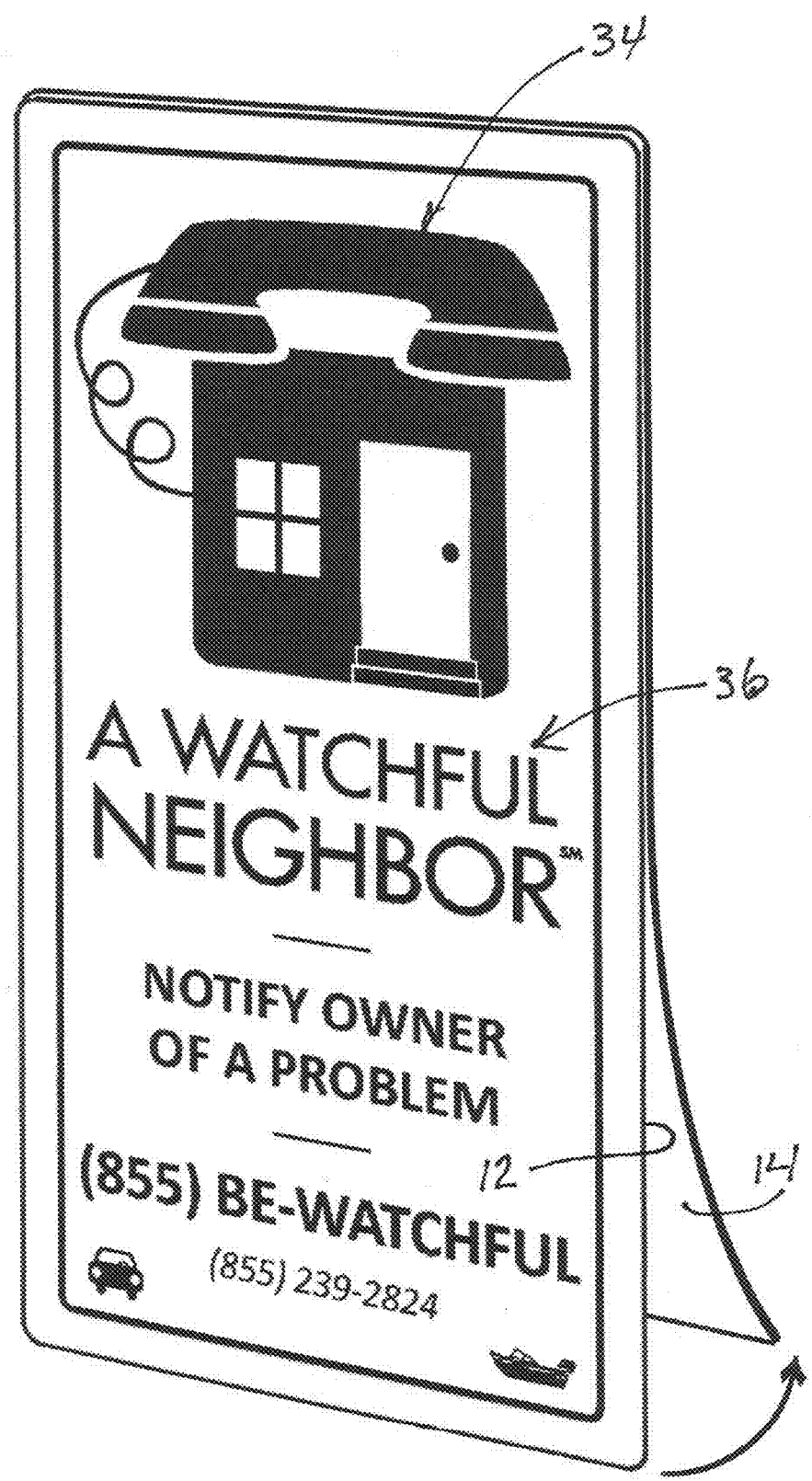
FIG. 3A is a perspective view of an example of a signage decal that can be placed on the exterior of a door or window or wall surface having a self-adhesive back surface with a release film.
Figure 4:
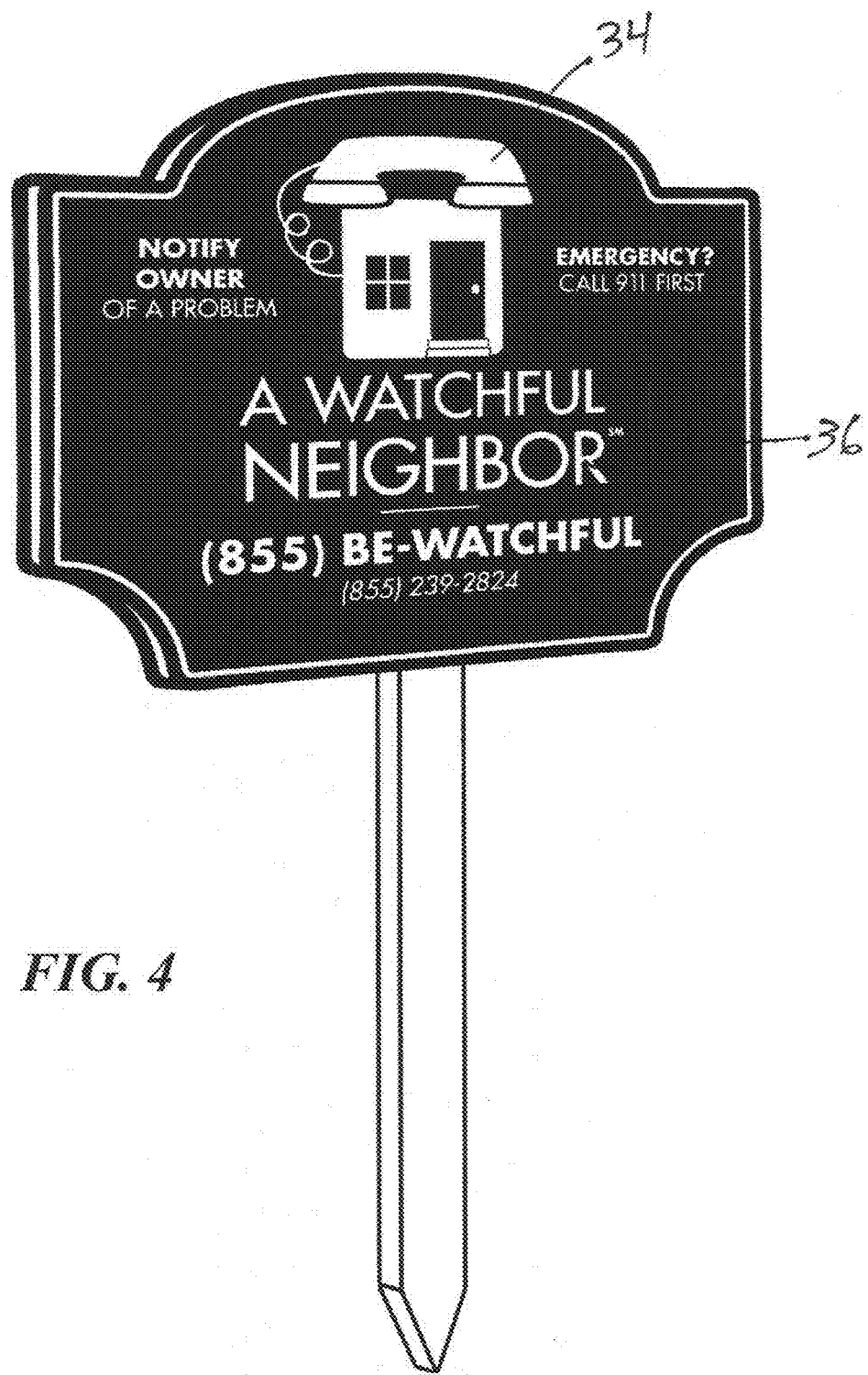
FIG. 4 is a perspective view of one example of a yard/garden sign that can be used in the implementation of the invention.
Figure 8:
FIG. 8 is a perspective view of an alternate embodiment of the sign of FIG. 4 wherein there is information allowing for website notification of issues or information.
Figure 9:
FIG. 9 is a perspective view of an alternate embodiment of the sign of FIG. 4 wherein there is a QR code in order to allow for Smartphone linking in order to either report or understand the concept of the current invention.

Also included are notification signs including yard/garden signs such as depicted in FIG. 4, FIG. 8 and FIG. 9. Other so-called notification signs include decals such as the inside window decal depicted in FIG. 3B and decals such as those shown in FIG. 3A. The latter are designed to be applied to an outside surface of the property item sought to be registered.

As noted, these notification signs are provided to the subscriber/owner when he/she first signs up. Also, if additional property is registered they can be provided at that time. Decals for a car and/or a boat would be supplied if those items were identified by the subscriber as "registered property". The subscriber/owner is cautioned that the decal in this instance should be placed in an area where the view of the driver is not obstructed; and, that wherever placed, it should be "readily visible."

Figure 6A:
FIG. 6A is a scanned image of one example of a vehicle having associated signage on one's property.
Figure 6B:
FIG. 6B is a scanned image of other property such as a trailer, boat, RV etc. having associated signage on one's property.
Figure 7:
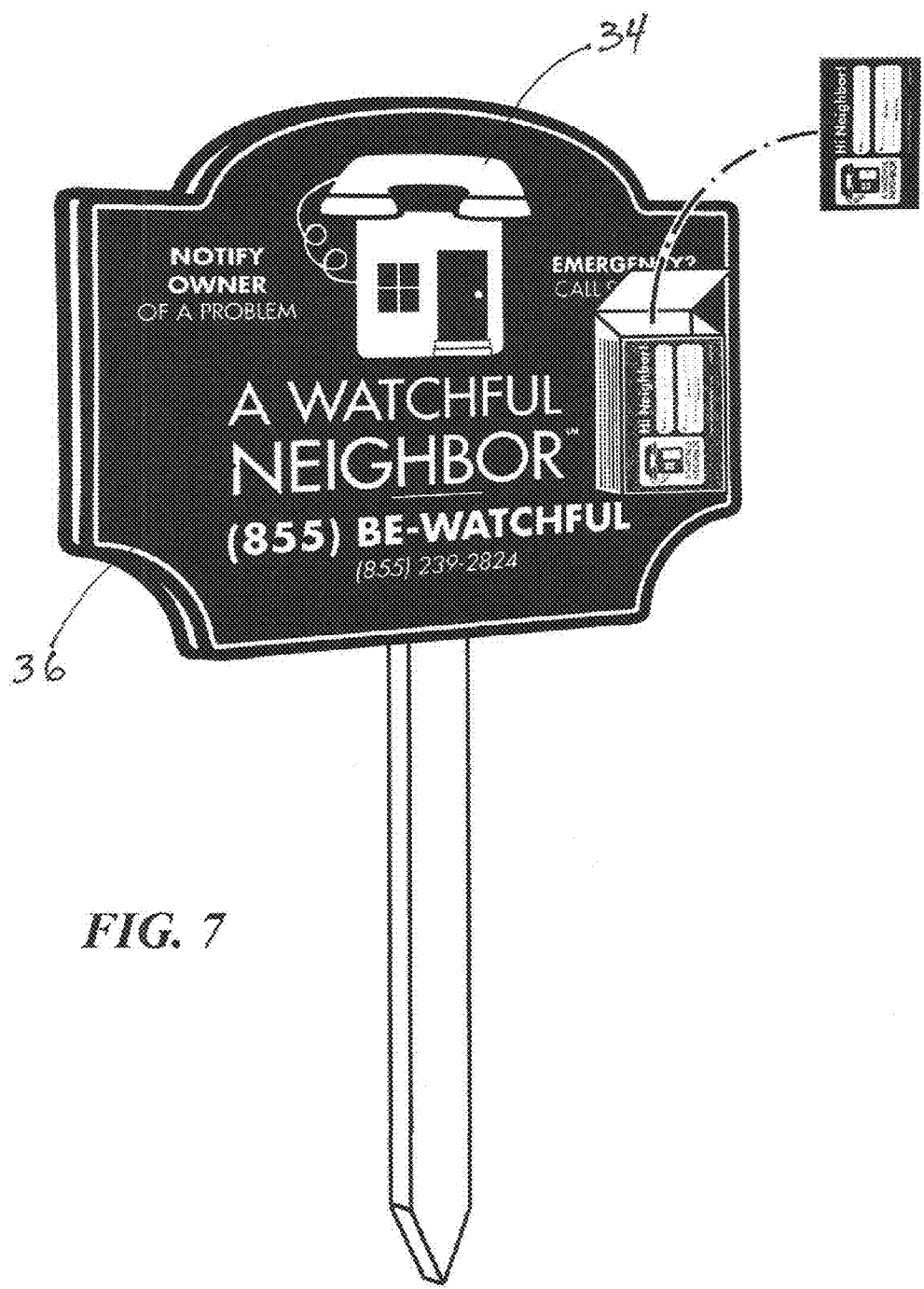
FIG. 7 is a perspective view of an alternate embodiment of the sign of FIG. 4 wherein there is a dispensing holder for the distribution of neighbor cards & promotional literature for the current invention.

The decal depicted in FIG. 3A includes an adhesive back side 12 which is protected prior to use by a releasable plastic sheet 14. The decal depicted in FIG. 3B includes a releasable plastic sheet 16 which covers the adhesive front side 18 prior to use. This type of decal is placed on the inside surface of a window in the home as shown in FIG. 1 at 22 (here, a different background tint and orientation from that shown in FIG. 3B, but the same idea), or on the interior side of a car, boat, RV or other vehicle window as depicted in FIGS. 6A and 6B.

If a yard/garden sign is received, it is accompanied by a supporting stake. The card is affixed to the stake and the subscriber/owner is directed to firmly plant the stake, 20 in FIG. 1, "into the ground in your front yard" again, "where it will be seen." It is the subscriber/owner's responsibility to make sure that the staked sign and its use will be compliant with municipal ordinances and homeowner associations.

Another functional item received from the operator of the service is what might be referred to as a "neighbor card".

Figure 2A:
FIG. 2A is a perspective view of the front of a "Neighbor Card" for distribution.
Figure 2B:
FIG. 2B is a rear perspective view of a "Neighbor Card" for distribution.

The front and back sides of these cards are depicted in FIGS. 2A and 2B. Space 24 is provided on the card where the property owner's name is placed. Space 26 provides room for the subscriber to insert the address and "identifying features" of the property. The latter, such as color or other distinguishing feature, is selected and noted so as to help the neighbor further differentiate a specific property from others in the immediate vicinity, especially if the house number is not readily visible or if there is limited light such as late evening or at night.

On the backside of the card, (depicted in FIG. 2B) instructions are provided in a designated space 28 that the neighbor should follow if "something happens to my property". In area 30, an instruction provides that in emergency situations, the neighbor first "call 911" and then the notification service, here identified as "A WATCHFUL NEIGHBOR". In the area designated as 32 in FIG. 2B, a telephone number is provided that is to be called, "if you see something". This number typically is depicted at least as an alpha-numeric to hopefully allow for its ready recall. As a convenience, the number is also set out in its familiar numeric form.

If the card is physically handed to the neighbor by the owner this may give the neighbor more accountability in that he may be more disposed to contact the service if an "occurrence" takes place. It may also promote camaraderie amongst neighbors. Of course, they could be left at a neighbor's home when necessary.

On each of the functional materials, there is a trademark logo 34 and/or a trademark phrase 36 prominently displayed. The logo especially is of relatively sufficient size so as to be hopefully, visually perceived from the street when the yard/garden sign and/or property decal is in place. As with most trademark logos, (think McDonald's Golden Arches), in time, they connote to the somewhat informed observer the nature of the service associated with the logo and perhaps conjure up an associated telephone number phrase (see the depiction in area 32 in FIG. 2B, i.e., "(855) BE-WATCHFUL"). The instructional communication depicted in FIG. 10, as noted above, emphasizes that the decals and yard/garden sign be placed so that they are "clearly visible". This will facilitate recognition of the trademark logo. Sign colors and/or sign contours can be employed to further suggest to the observer that the property is enlisted with the notification service.

As part of the method of the invention, a central call center is provisioned. The call center includes a computer system that is programmed to allow access to a database wherein the predetermined, solicited information of the subscribers of the service is stored. The information (billing, property and contact) for the database is obtained by the operator (see above) and uploaded to the computer database of the call center as frequently as necessary to keep the database current. Retrieval of this information by an employee of the call center is achieved through typical means such as entry of key word access information, e.g. the property address, via a keyboard and monitor.

Access information includes the property address or, if known, a property owner name (assuming this is one and the same with the subscriber name). The subscriber would be encouraged at registration to provide an access name for purposes of the central call center's activities, if it were probable that the observer would use a name other than the subscriber's to associate with the property involved (the elderly parent scenario, for example). For a car or boat the corresponding vehicle license plate number and state or boat registration number is the necessary entrée to the stored information.

The call center activity begins when an observer of an event dials up the phone number for the notification service. As discussed above, this phone number would be in place on the yard/garden sign or decal or, hopefully, in time, of second nature to the observer due to the notoriety of the service. Of course, the "neighbor card" as noted, includes that information. Typically, the phone number is that of the service operator. It is forwarded to the call center over a designated line that allows the call center to know that the received call pertains to the notification service. Once received, in the preferred embodiment a prerecorded message is played, "Thank you for calling the notification service call center. If this is an emergency, please hang up and call 911. After 911 is called, please call us back, and we will notify the property owner." After a predetermined brief period of time, or upon a prompt, the call is switched through to a call center employee. The call center employee will then utilize a script containing prescribed questions that are ordered in a predetermined way. The script is written and structured so as to elicit the necessary information as quickly as possible.

Figure 5A:
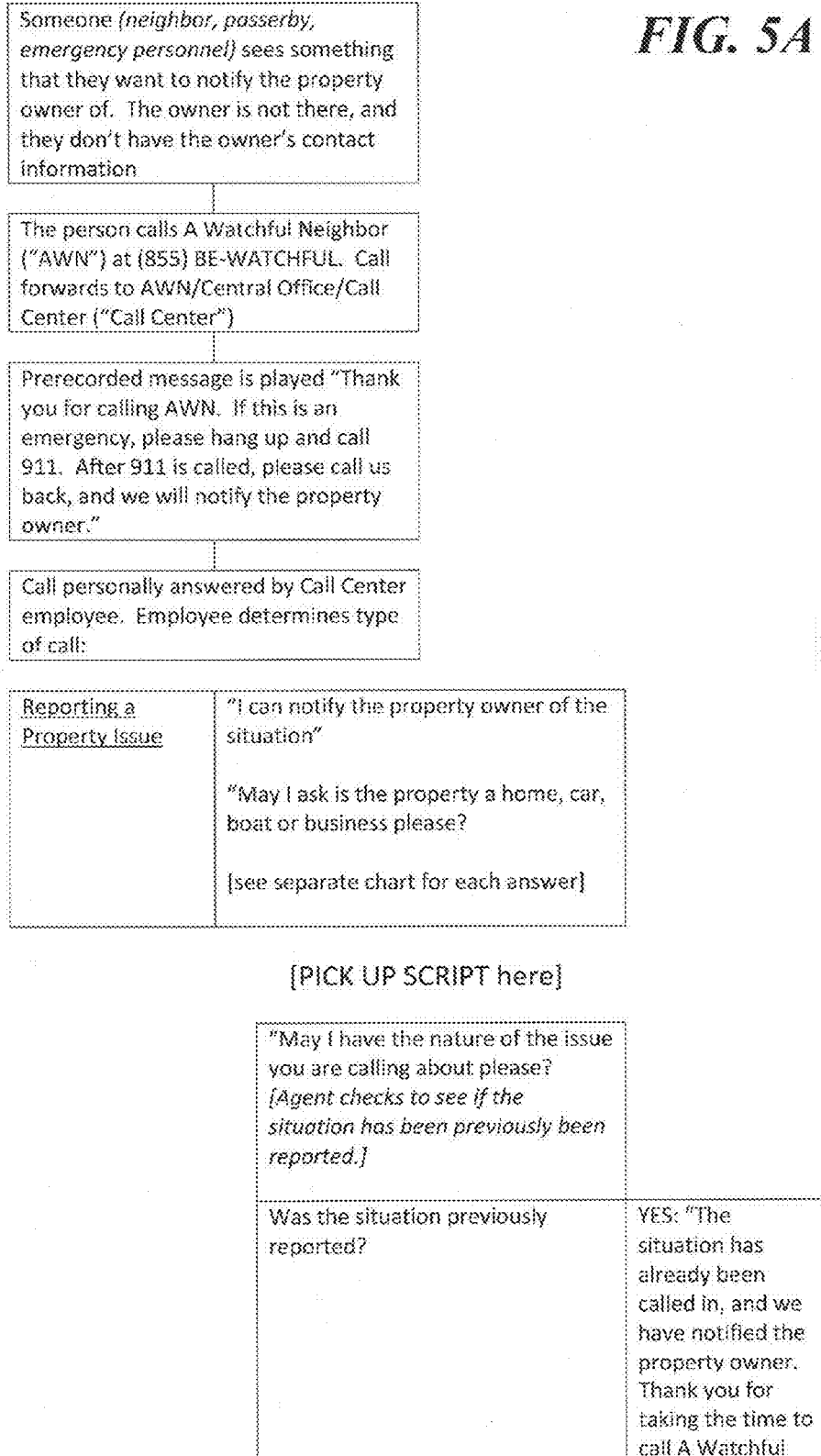

The copyrighted script, including pertinent questions in the predetermined order, is as set out in FIGS. 5A, 5B, 5C and 5D. The sequence of questions proceeds from the top of FIG. 5A to the near-midpoint thereof. The call center employee first obtains a response to the question of whether the property involved is a "home, car, boat or business". If the observer identifies "home", the sequence picks up at the top of FIG. 5C. The observer is asked to identify the address of the property. Ideally this is the full address. If a partial address such as a street name is all that the observer knows this still may be sufficient to access the property in the database, particularly so if the additional information set forth in column 3 of FIG. 5C is conveyed (this information was entered as part of the property description—see above). If the property is located, the call center operator returns to the scripted questioning beginning at the bottom third of FIG. 5A. The questioning will continue there but if the situation had been previously reported to the call center it will have been documented. If so, this fact is made known to the observer and he is thanked for taking the time to contact the notification service. If the situation was not previously reported the particulars are entered into the computer. The call center is instructed to then inquire of the observer about his/her contact information. The nature of the questions and various outcomes is set forth on FIG. 5B. Irrespective of whether the observer wishes to provide contact information the observer is thanked and advised that the property owner will be notified immediately.

If the observer identifies "car" to the first question, the sequence picks up at the near-midpoint of page FIG. 5C where the questions and consequences of YES, NO responses are set forth.

If the observer identifies "boat" to the first question, the sequence picks up at the near-midpoint of page FIG. 5D where the questions and consequences of YES, NO responses are set forth.

If the observer identifies "business" to the first question, the sequence picks up at the top of page FIG. 5C and proceeds as if the property were a "home".

Once the call is complete and notification is required, the call center employee will then notify the various contact persons previously identified by the subscriber, via the respective modes (phone call-house, work and cell, text, email), and in the preferred order as designated by the subscriber for each. Once the relevant contacts are notified, it will be up to one or more of them to decide how to best assess and resolve the situation (come home, call a trusted friend, etc). If the call center cannot reach any of the contacts, repeated attempts are made to do so. Once a contact is made, the matter is considered complete.

Registering with the notification service, which applicant has chosen to call "A WATCHFUL NEIGHBOR", is primarily web-based. The main phone number is toll free. It is selected so as to be easily remembered, for example, again, (855) BE WATCHFUL.

Using a call center allows for coverage 24/7/365. The call center will also store the text details of the conversations and actions. And for a specified period of time, the actual audio of voice conversations are stored in case there is any problem that may come up if someone says that they did not get a message, or if an instance of abusive behavior has taken place.

The principles and purposes of the invention can be applied to cover an individual subscriber/owner's personal property. For example, it is envisioned that a wallet size card with the owner's name and the service's contact information might be issued for the individual subscriber to keep in his wallet or purse. Also, key-ring, size tags with a unique ID number and service contact information, can be provided to affix to an individual's keys. Other personal property can also benefit from the purposes of the invention.

FIG. 9 depicts a QR code displayed on the property sign. If used, this provides an opportunity for an observer to scan the code with a smartphone and be directed to a website where additional information may be accessed to facilitate the notification process.

Unique identification numbers can also be assigned to individual subscriber/owners. These can be inserted on the neighbor cards and on the decals affixed to the property. Similar to the QR codes, these will allow immediate access to the subscriber/owner profile and hasten the contact process.

Applicant herein proposes a unique, notification service which provides a way for property owners (subscriber/owner) to know when something of consequence occurs at their home while they are away from it (once again, the word "home" is intended to apply not only to a property owner's permanent residence, but also to other locations where an individual has an ownership or leasehold interest and/or where it can be expected property will be located for a period of time); or to other property in which they have an interest, such as a car or boat, and that can be observed by others; or, any other circumstance of which it is important to become aware that involves a subscriber/owner's property or a related person's property or well-being.

The present invention comprises a method and system which in effect acts as an intermediary between at least one of a cadre of "watchful neighbors", that is the people who notice and report the event, and the subscriber/owner.

The method and system of the present invention does not require that the subscriber/owner's biographical information be known to the people who observe the occurrence. The method and system disclosed provides for notice to the subscriber/owner, or the other named contact persons, 24/7, 365 days a year. The notification service can be used by homeowners (single residence, condominium, townhouse, etc.); business owners (brick and mortar storefronts); owners of vacation and second homes; building owners/landlords; families of senior citizens living independently; people living alone (all ages); owners of rental properties; renters of apartments, homes, etc.; families with "latch key" children (children home alone after school while parents at work); car owners; boat/watercraft owners; private aircraft owners; and homeowners with traditional security alarm systems installed.

Possible events that might require the initiation of the notification service would include the following: fallen tree or limb; child home alone that needs assistance (locked out, minor injury, bullying situation); water pipe burst or water leaks (or sprinkler system hose burst) in home or adjacent apartment; fire, ambulance, burglary or other response handled by emergency personnel and owner needs to be notified; senior citizen resident exhibiting troubling, but not life-threatening, behavior; senior citizen involvement with a questionable character, which may result in abuse of them or their finances; superintendent seeking permission to access apartment; utilities disrupted, power line down; continuous audible alarm (home, business or car); "teen" parties-potentially unauthorized or unsupervised (instead of police being called); front door or garage door left open for extended period of time; wandering pet when no one home; pile-up of mail, newspapers, and delivered packages left unattended; broken window; hole in roof; strange car or truck in driveway for extended period of time while owner is on vacation; parked car involved in accident, damaged due to other reasons, or alarm sounding; problem/damage with boat/watercraft kept in a marina or at a mooring; and, problem/damage with private aircraft parked at home airport or visiting airports.

Other variations on the above described method and system will be apparent in view of the drawings and this accompanying specification. The invention is not to be construed as limited only to what has been depicted and described. Rather, its breadth and scope can only be defined and limited by the claims that follow.

What is claimed is:

1. A system adaptable for supporting a notification service provided by an operator to a subscriber to said service, the service providing notice to at least two contact persons about possible consequential events that do or may have an effect on property, both real and personal, or on a person, said property or person associated with the contact persons, said possible consequential events consisting of events that are monitored by an alarm system, events intended to be monitored by an alarm system that fails to detect the event or malfunctions before or during occurrence of the event, and events that are not monitored by an alarm system, the system comprising:

(a) computer processor, said processor adaptable to store in suitable format in an associated database pertinent information provided by the subscriber to said service, the pertinent information provided by the subscriber including, (i) subscriber information including the subscriber's name and address, (ii) registered property information including the property address if the property is real property and the property owner's name, and (iii) at least two contact person information sets including the respective contact person name and at least one of a group of respective contact modes for each said respective contact person including one of at least the following, cell telephone number to be used for calls and text, work phone number, home phone number and e-mail address for said respective contact person and, where there is more than one said contact mode for said respective contact person, the preferred sequence of employing said contact modes to reach said respective contact person;

(b) a plurality of informational materials, said materials including, (i) at least a first communication from the operator setting forth at least, the step-by-step procedure to be followed by a recipient of said informational materials in implementing at least a portion of said notification service, the recipient being a person identified in said pertinent information, the recipient being either the subscriber or the owner of the registered property, (ii) at least in the case of said registered property being real property, at least one neighbor notification card, each said card to be distributed to a person described in said at least said first communication as belonging to a first category of observers that occupy a property in close proximity to said registered property such that the probability of observing the consequential event is enhanced, said neighbor notification card including informational indicia to facilitate the placement of the registered property owner's name and/or the registered property address thereon as well as contact information about how to contact a central call center, said contact information including a telephone number expressed in at least an alpha-numeric form such that the recall of the number by a member of said first category of observers is facilitated, (iii) at least in a case where said registered property is real property, said informational materials further includes at least one notification sign having a distinct visual appearance based on one or more of at least the following, color, shape, trademark, said at least one notification sign placed on or about a registered property as suggested by said at least said first communication where expectedly it would be seen by a member of a second category of observers including passersby, postal carriers, emergency personnel and utility workers, said at least one notification sign further including contact information for contacting the central call center identified in paragraph (d) hereinafter, said contact information including a telephone number expressed in at least an alpha-numeric form such that the recall of the number by a member of said second category of observers is facilitated;

(c) a predetermined question protocol designed to ascertain certain minimum information about the registered property and the consequential event, (d) a central call center;

said suitable format of said stored pertinent information such that said pertinent information is readily accessible by an employee of said central call center, as needed, when said call center is contacted about an event involving the respective subscriber or a person associated therewith, said central call center adapted to receive a notification call from a party prepared to discuss the consequential event, said party not necessarily a subscriber to the notification service, said central call center further adapted to enable an employee of the call center to engage the party in a discussion, the discussion following said predetermined question protocol, said minimum information when ascertained sufficient to enable the employee to access the stored pertinent information and retrieve respective information including said contact persons information sets from the computer database; and, said central call center adapted to initiate communication attempts by the employee utilizing all of the respective contact modes for each of the contact persons, and doing so in the preferred respective sequence of contact modes for each said contact person, so as to contact each of the respective contact persons and advise that person about the event.

2. The system claimed in claim 1, wherein upon receipt of a notification call from a party, the notification service is adapted to first respond with a recorded message querying the party about whether in fact the event to be reported is an emergency and if so, would they please hang up, then call an emergency number such as 911 to report the event and then call the notification service back to discuss the event with an employee of the central call center.

3. The system claimed in claim 1 wherein one of the contact persons is the subscriber.

4. The system claimed in claim 1 wherein one of the contact persons is the property owner.

5. The system claimed in claim 1 wherein the predetermined question protocol includes a plurality of questions following a predetermined script, said questions written and ordered in a predetermined way so as to include determining by the employee from the party initially whether the event involves a home, a car, a boat or a business; and then, (i) if a home or business property, determining from the party at least a minimum amount of information about the property sufficient to allow the employee to access and retrieve property information stored in the database about said home or business; and then, (ii) requesting of the party, the nature of the event that the party is calling about; and then, (iii) comparing the information obtained from the party in the immediately preceding step with the property information retrieved to see if the event had been previously reported; and then, (iv) if the employee determines that the event had not been previously reported, the employee advises the party that the employee will notify the property owner.

6. The system claimed in claim 5 wherein the said at least minimum amount of information obtained from the party about the property includes the name of the street on which the property is located but no street number.

7. The system claimed in claim 5 wherein the event involves a car and wherein the employee requests of the party, the license plate number and issuing state for the car, and, if known to the party, the employee attempts to access stored pertinent information based on the license plate number and issuing state and, if retrieved, requests of the party, the nature of the event about which the party is calling, and if the employee determines that the event has been previously reported, advises the party of that fact, but if the employee determines that the event has not been previously reported, the employee advises the party that the property owner will be immediately contacted.

8. The system claimed in claim 5 wherein the event involves a boat and wherein the employee requests of the party, the boat registration number, and, if known to the party, the employee attempts to access stored pertinent information based on the boat registration number and, if retrieved, requests of the party, the nature of the event about which the party is calling, and if the employee determines that the event has been previously reported, advises the party of that fact, but if the employee determines that the event has not been previously reported, the employee advises the party that the property owner will be immediately contacted.

9. The system claimed in claim 1 wherein the notification card is left at a neighbor's home in the neighbor's absence.

10. The system claimed in claim 1 wherein the subscriber is provided with a card, said card having disposed thereon in a visually apparent manner, certain indicia including information on how to contact a central call center and wherein the subscriber is directed in said plurality of informational materials to insert said card in a recipient's portable, personal property carrying item such as a wallet.

11. The system claimed in claim 1 wherein the subscriber is provided a key tag, said key tag adapted to be affixed to a recipient's key ring, said key tag having disposed thereon in a visually apparent manner, certain indicia including a respective unique number assigned by the operator to the subscriber and information on how to contact a central call center.

* * * * *